United States Patent [19]

Knödel

[11] Patent Number: 4,633,765
[45] Date of Patent: * Jan. 6, 1987

[54] PISTON FOR PRECISION DOSING INSTRUMENT

[75] Inventor: Erich Knödel, Wertheim, Fed. Rep. of Germany

[73] Assignee: Walter Graf u. Co GmbH & Co., Wertheim, Fed. Rep. of Germany

[*] Notice: The portion of the term of this patent subsequent to Feb. 26, 2002 has been disclaimed.

[21] Appl. No.: 679,959

[22] Filed: Dec. 10, 1984

Related U.S. Application Data

[63] Continuation-in-part of Ser. No. 418,132, Sep. 15, 1982, Pat. No. 4,501,192.

[30] Foreign Application Priority Data

Sep. 28, 1981 [DE] Fed. Rep. of Germany ....... 3138536

[51] Int. Cl.⁴ .......................... B23P 15/10; F16J 1/02
[52] U.S. Cl. ................................ 92/248; 29/156.5 R; 92/254; 604/222; 604/230

[58] Field of Search ................. 92/109, 248, 249, 254, 92/245; 29/447, 156.5 R; 604/222, 230; 222/386; 277/212 C

[56] References Cited

U.S. PATENT DOCUMENTS

| | | | |
|---|---|---|---|
| 2,315,944 | 4/1943 | Dick | 92/249 X |
| 2,607,342 | 8/1952 | Abel | 92/249 X |
| 2,895,773 | 7/1959 | McConnaughey | 92/249 X |
| 3,237,815 | 3/1966 | Ogle | 602/222 X |
| 4,315,454 | 2/1982 | Knodel | 92/249 X |
| 4,501,192 | 2/1985 | Knodel | 92/248 |

FOREIGN PATENT DOCUMENTS 2343687  3/1975  Fed. Rep. of Germany ........ 92/248

Primary Examiner—Edward K. Look
Attorney, Agent, or Firm—Jordan and Hamburg

[57] ABSTRACT

A piston for a precision dosing instrument includes a cylindrical core which may be made of glass, ceramic or metal, and a precision ground sleeve of polytetrafluorethylene disposed over the core. One end of the sleeve is closed while the core is open at both ends.

13 Claims, 1 Drawing Figure

U.S. Patent   Jan. 6, 1987   4,633,765
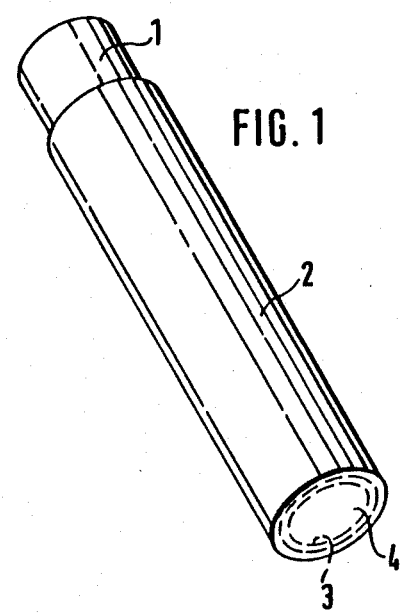

PISTON FOR PRECISION DOSING INSTRUMENT

This is a continuation-in-part Application of U.S. Ser. No. 418,132 filed Sept. 15, 1982 (now U.S. Pat. No. 4,501,192 issued Feb. 26, 1985.

BACKGROUND OF THE INVENTION

This invention relates to a piston for a dosing precision instrument with a cylindrical core and a method for its manufacture.

A piston composed of a cylindrical core of glass, ceramic, or metal has been known from Federal Republic of Germany DE No. 27 43 911 B2, wherein a rigid, grindable sleeve jacket of a glass-fiber reinforced polytetrafluorethylene (GFPTFE) has been thermally shrunk thereon. This piston serves as a dosing piston for the glass cylinder of a dosing precision instrument. Herein a dosing instrument that is mostly used in laboratories is understood as a precise dosing instrument, of which a stable, reproducible dosing exactness of at least ±0.1 vol. -% is expected in the long run. This, in turn, requires observing as much as possible dimensioning and tightness requirements for the contact surface between the inside wall of the glass cylinder and the outer wall of the piston. It should, furthermore, be possible to subject such a dosing instrument to sterilization in the not-disassembled state, i.e. not disassembled while heated at or over 120° C. temperature. The piston should, furthermore, be completely inert and stable in relation to all corrosive chemicals to be dosed. This, according to experience, in addition to a purely chemical consistency of the material employed to manufacture the piston jacket, presupposes that the walls of the jacket be absolutely impermeable to the media to be dosed.

This known piston has a few disadvantages in regard to the above requirements. Thus, for several reasons, it has been found desirable to preferably manufacture the core of the piston of a ceramic raw material. On formation of the jacket with an open front end at the working surface, however, the raw material of the ceramic core is vulnerable to corrosive attach by one of the corrosive media to be dosed. Yet, even the most expensive ceramic raw materials always contains small amounts of binding agents that can be dissolved out of the ceramic material. This causes problems which cannot be tolerated if, for instance, such a dosing precision instrument is to be used in connection with trace analysis. Attempts to close or lock the open closure area of the piston core by a jacket material have not been successful. Displacements of these closures occurred in all cases, which increased dosing errors in a measurable way.

Futhermore, efforts have been made to design construction of the cylindrical wall of the sleeve jacket as thin as possible. However, the loss of permeability of the PTFE raw material with its inherent porosity sets limits to such efforts. This is especially the case when a fiber-reinforced material, especially a glass fiber reinforced PTFE, is utilized. If, while utilizing such a raw material, a critical minimum wall thickness is not attained, then diffusion of the medium to be dosed across the phase limiting areas between the reinforcing fibers and the PTFE matrix occurs, which ultimately leads to destruction of the PTFE jacket. The GFPTFE jacket has to have a certain minimum thickness to prevent this from occurring which in the raw materials that are used most of the time, in terms of magnitudes, lies in the range of 1.0 mm or a little below this limit. For thermal reasons, however, thinner wall thicknesses were absolutely desirable. Such thinner wall thicknesses would not only extend the temperature working range of the dosing instrument, but also make sterilization of the not-disassembled instrument at higher temperatures possible.

Considering this state of the art, the present invention has as an object to provide a piston of the aforementioned type which can be formed with a closure jacket at its working end that does not shift in position and does not cause the glass cylinder to burst upon sterilization of the dosing precision instrument, and wherein the jacket can be formed with a reduced cylindrical wall thickness.

The invention provides, in a piston for a dosing precision instrument with a glass cylinder, not to shrink thermally the heretofore used rigid jacket onto a core of solid material or onto a core of a glass sleeve jacket closed at one end, i.e., the working end, but, instead, onto a rigid cylindrical core of glass, ceramic, or metal that is formed as a rigid tube open on both sides.

Very surprisingly, it has been found that on thermal shrinking of a sleeve jacket closed at one end, a working face is obtained at the working end of the piston which, after surface grinding, remains invariably smooth under all thermal and chemical conditions at least if the piston diameter is relatively small. An explanation for this effect may be that the second portion of the sleeve is tensioned in a manner of a tympanic membrane across the open working end of the piston core. A plane and flat working surface of the sleeve at the working end of the piston is an absolutely demand for a precision dosing instrument in question.

Since in this way an hermetical sealing of the working area of the dosing piston by the material of the sleeve is obtained, the manufcturer, as also the consumer, no longer has to fear an exchange between the medium to be dosed and the core material of the piston. The manufacturer of the dosing precision instruments may select the raw material for the piston core from a purely constructional view point, without being limited by the chemical properties of the raw material of the piston core. Moreover, the locking of the boundry surface between the piston jacket and the piston core opposite the medium to be dosed prevents the penetration of the medium to be dosed into the boundry area from the outstart. It was ascertained that thereby the durability of the piston can be extended especially in face of organic dissolving agents. At the same time, this makes it possible to form the cylinder wall thickness of the sleeve up to inside the critical boundry area much thinner, without this affecting in any way the edge life of the piston.

However, it was ascertained that the greatest surprise derived from the utilization of a piston according to the present invention resided in the fact that a pure, not-reinforced PTFE could be used even for sleeve bottom thicknesses up to about 8 or 10 mm. A dosing precision instrument with a glass cylinder provided as a piston according to the present invention, namely a jacket of pure PTFE and a bottom closure in one piece with a thickness not larger than 10 mm, wherein the thickness of the cylindrical PTFE jacket wall is not larger than about 0.5 mm, can be heated in a not-disassembled state up to about 150° C. in a drying oven, without the risk of the glass cylinder of the dosing precision instrument ever bursting. It is assumed that this is made possible by the increased radial upsetting of the closure bottom resulting from the formation of the piston core as a tube that is open on both ends. The great advantage in utilizing a rigid sleeve jacket, formed from a massive semi-finished material of pure PTFE as compared to a corresponding jacket of a fiber-reinforced material of pure PTFE resides in the fact that such a jacket of not-reinforced PTFE remains impermeable up to distinctly smaller wall thicknesses since with pure PTFE, the risk of diffusion at the boundary area along the reinforcing fibers no longer exists. In addition, pure PTFE can better withstand chemical attack than reinforced PTFE.

According to the previously described formation of the device of this invention, the dosing percision instrument of the invention is preferably provided with a sleeve of an unfilled and non-reinforced pure PTFE. In a comparison with the dosing piston known from Publication DE No. 23 43 687 A 1, which is provided with a PTFE layer applied through coating, the piston of the present invention, which is provided with a jacket of thermally shrunk semi-finished material, has the advantage of absolute impermeability even opposite aqueous mineral acids, concentrated aqueous alkali metal lyes as well as organic dissolving agents, especially carbon tetrachloride. Since the known piston coatings produced through coating are not, and cannot be, shrunk to the same extent as a PTFE semi-finished material, from which the piston of the present invention is produced, such impermeability cannot, in principle, be achieved in known pistons. In addition, the known pistons are substantially more vulnerable to mechanical damage.

As already indicated above, another advantage of the piston according to the present invention resides in the fact that the end closure of the sleeve can be formed substantially thicker than the cylindrical sleeve surface. In a further embodiment of the invention, the bottom is preferably at least five times, and especially ten times as thick, measured in the axial direction than the cylindrical jacket wall measured in the radial direction. Such dimensions represent an ideal combination of thermal and chemical characteristics in the piston.

When a pure, not-reinforced PTFE is used, as also on utilization of a reinforced PTFE as a raw material for the sleeve especially a fiber or powder-reinforced PTFE, the sleeve to be shrunk thermally on the core tube or the jacket sleeve, according to one embodiment of the invention, is preferably manufactured out of a massive solid material in the form of a round rod which is bored or reamed. Such a starting material distinguishes itself by an uncommonly large thickness, resulting in impermeability for the PTFE which has strong tendencies toward macro-porosity and microporosity. In addition, an absolutely tight transfer area is obtained, with no need to provide it by subsequent sintering, thus an absolutely tight connection between the closure bottom and the cylindrical sleeve part is attained where even after years of continuous use, any diffusion of the medium to be dosed into the boundary surface between the jacket and the piston core is successfully excluded.

To manufacture the piston according to this invention, a solid material in the form of a round rod is preferably first cut to the desired length, being then provided with a boring or is reamed. The inner diameter of the PTFE cover or jacket thus manufactured through boring or lapping is preferably 2 to 3% smaller than the outer diameter of the core tube. The outer diameter of the PTFE sleeve to be thermally shrunk onto the core tube is larger than the nominal diameter planned for service purposes, being preferably larger by about 5 to 15% than the nominal diameter. The sleeve thus produced from a reinforced or not-reinforced PTFE solid material may be shaped by material-lifting or machining and is heated uniformly to a temperature in a range between 200° to 250° C. The heated cover is then pressed over a core tube at room temperature. Subsequently, the thus obtained unified piston is cooled to room temperature. After the cooling, the outer jacket of the piston is ground to the nominal dimension and, in the case of a PTFE material filler, subsequently polished for precision.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic perspective representation of a piston according to one embodiment of the invention.

DESCRIPTION OF THE PREFERRED EMBODIMENTS

FIG. 1 is a perspective view of one embodiment of the present invention. A core 1 consists of a tube of ceramic or other material open on both ends, thus a tube which has an open front area 3 at the working end. A sleeve 2 made of a pre-fabricated rigid PTFE tube has been thermally shrunk on the core, the tube being provided with an enclosed working surface 4 at the working end through a closure that has been formed onto it as one single piece. The working surface 4 and the cylindrical surface of sleeve 2 thus have been formed in one single piece of a rigid semi-finished material. The closure with the working surface 4 closes the open front end 3 of the tube-shaped piston core 1. The outer diameter of the sleeve 2 is formed of a rigid PTFE semi-finished material which has been made to fit snugly the glass cylinder on which the piston is inserted.

I claimed:

1. A piston for a precision dosing instrument comprising:
a cylindrical core and a sleeve of polytetrafluoroethylene disposed on said core, said core being of glass, ceramic or metal and being formed as a rigid tube open at both longitudinal ends, said sleeve having a cylindrical first portion extending about the cylindrical walls of said core and a closed end second portion extending over one of the longitudinal ends of said core forming the working end of the piston and having a rigid planar front working face extending perpendicularly of the longitudinal axis of said core, said sleeve being thermally shrunk onto said core thus tensioning said closed end portion and is precision-ground finished.

2. A piston according to claim 1, wherein a reinforced polytetrafluoroethylene is utilized as a sleeve material.

3. A piston according to claim 1, wherein said second portion is at least five times thicker than said first portion.

4. A piston according to claim 1 wherein said sleeve is formed as one integral piece.

5. A piston according to claim 1 wherein the diameter of said piston substantially is smaller than 50 mm.

6. A piston according to claim 1 wherein said piston when used in said dosing instrument is operable to reproduce dosing exactness of at least plus or minus 0.1 percent by volume.

7. A piston according to claim 1 wherein said piston is sterilizable in a non-disassembled state at a temperature of up to at least 150° C. and the relative position of said sleeve and said cylindrical core is maintained without shifting during said sterilization.

8. A piston according to claim 1 wherein said cylinder core is made of glass and said piston is sterilizable in a non-disassembled state at a temperature of up to at least 150° C. with the integrity of the glass cylindrical core being retained intact without bursting during said sterilization.

9. A piston according to claim 1 wherein said sleeve is hermetically sealed to said cylindrical core.

10. A piston according to claim 1 wherein said rigid planar front has a thickness of about 8 to 10 mm. and the thickness of said sleeve is not larger than 0.5 mm.

11. A piston for a precision dosing instrument operable to reproduce dosing exactness of at least plus or minus 0.1% by volume comprising a cylindrical core and a polytetrafluoroethylene sleeve disposed on said core, said core being of glass, ceramic or metal and being formed as a rigid tube open at both longitudinal ends, said sleeve having a cylindrical first portion extending about the cylindrical walls of said core and an integral closed end second portion extending over and closing off one of the longitudinal ends of said core to thereby form the working end of the piston, said closed end second portion having a rigid planar front working face extending perpendicularly to the longitudinal axis of said core, a hermetic seal between said core and said cylindrical first end portion, said closed end second portion having incorporated therein tensioning means which disposes the closed end second portion under tension, said hermetic seal and said tension means being effected by thermally shrinking said sleeve on to said core, and a precision-ground finish on said sleeve, said piston being sterilizable in a non-disassembled state at a temperature of up to at least 150° C. with the relative position of said sleeve and said cylindrical core being maintained intact without shifting during said sterilization.

12. A piston for a precision dosing instrument operable to reproduce dosing exactness of at least plus or minus 0.1% by volume comprising a cylindrical core, a polytetrafluoroethylene sleeve of a thickness of not larger than 0.5 mm and an outer diameter of no larger than 50 mm, said sleeve being disposed on said core, said core being made of glass, ceramic or metal and being formed as a rigid tube open at both longitudinal ends, said sleeve having a cylindrical first portion extending about the cylindrical walls of said core and an integral closed end second portion extending over and closing off one of the longitudinal ends of said core to thereby form the working end of a piston, said closed end second portion having a rigid planar front working face of about 8 to 10 mm extending perpendicularly to the longitudinal axis of said core, a hermetic seal between said core and said cylindrical first end portion, said closed end second portion having incorporated therein tensioning means which disposes the closed end second portion under tension, said hermetic seal and said tension means being effected by thermally shrinking said sleeve onto said core, and a precision-ground finish on said sleeve, said dosing instrument being sterilizable in a non-disassembled state at a temperature of up to at least 150° C. with the relative position of said sleeve and said cylindrical bore being maintained intact without shifting during said sterilization.

13. A method for manufacturing a piston for a precision dosing instrument comprising the steps of providing a cylindrical core of glass, ceramic or metal as a rigid tube open at both longitudinal ends, providing a round rod of polytetrafluoroethylene material, forming a longitudinally extending opening in said rod of a diameter smaller than the outer diameter of said core, said longitudinally extending opening extending substantially the longitudinal length of said rod but terminating short of one longitudinal end of said rod to thereby provide a rigid closed end on said rod such that said rod thereby defines a sleeve having a rigid closed end, heating said sleeve to a temperature of from 200° to 250° C., inserting said core into said heated sleeve while said core is at ambient temperature, allowing said sleeve upon cooling to shrink to thereby tension said closed end and to obtain a unified piston, and machining the outer sleeve to a desired final dimension and finish.

* * * * *